(12) United States Patent
Putnam et al.

(10) Patent No.: US 6,763,043 B2
(45) Date of Patent: Jul. 13, 2004

(54) TUNABLE GRATING-BASED DISPERSION COMPENSATOR

(75) Inventors: Martin A. Putnam, Cheshire, CT (US); Alan D. Kersey, South Glastonbury, CT (US); Timothy J. Bailey, Longmeadow, MA (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 10/224,157

(22) Filed: Aug. 20, 2002

(65) Prior Publication Data

US 2003/0072531 A1 Apr. 17, 2003

Related U.S. Application Data

(63) Continuation-in-part of application No. 09/675,455, filed on Sep. 28, 2000, now abandoned, and a continuation-in-part of application No. 09/675,456, filed on Sep. 28, 2000, now abandoned, and a continuation-in-part of application No. 09/455,868, filed on Dec. 6, 1999, and a continuation-in-part of application No. 09/455,865, filed on Dec. 6, 1999, now Pat. No. 6,519,388, which is a continuation-in-part of application No. 09/399,495, filed on Sep. 20, 1999, now abandoned, which is a continuation-in-part of application No. 09/205,943, filed on Dec. 4, 1998, now abandoned, application No. 10/224,157, which is a continuation of application No. 10/146,773, filed on May 16, 2002, now Pat. No. 6,597,711, which is a continuation-in-part of application No. 09/707,084, filed on Nov. 6, 2000, now abandoned, which is a continuation-in-part of application No. 09/691,997, filed on Oct. 19, 2000, now Pat. No. 6,363,089, which is a continuation of application No. 09/456,112, filed on Dec. 6, 1999, now Pat. No. 6,229,827, which is a continuation-in-part of application No. 09/400,362, filed on Sep. 20, 1999, now abandoned, which is a continuation-in-part of application No. 09/205,846, filed on Dec. 4, 1998, now abandoned, application No. 10/224,157, which is a continuation-in-part of application No. 09/699,940, filed on Oct. 30, 2000, now Pat. No. 6,621,957, which is a continuation-in-part of application No. 09/519,240, filed on Mar. 6, 2000, now abandoned

(60) Provisional application No. 60/276,456, filed on Mar. 16, 2001.

(51) Int. Cl.[7] .............................................. H01S 3/30
(52) U.S. Cl. ................................ 372/6; 372/20; 385/37
(58) Field of Search ............................. 372/6, 64, 20, 372/92; 385/37, 24

(56) References Cited

U.S. PATENT DOCUMENTS

| 4,725,110 A | 2/1988 | Glenn et al. ............... 350/3.61 |
| 4,807,950 A | 2/1989 | Glenn et al. ............... 350/3.61 |

(List continued on next page.)

FOREIGN PATENT DOCUMENTS

| EP | 0997764 | 5/2000 |
| EP | 10 24376 | 8/2000 |

(List continued on next page.)

OTHER PUBLICATIONS

Putnam et al; "Fabrication of tapered, strain–gradent chirped fibre Bragg gratings", Electronic Letters, IEE Stevenage, GB, vol. 31, No. 4, 309–310, 2/95.

(List continued on next page.)

*Primary Examiner*—Hung X. Dang

(57) ABSTRACT

A tunable dispersion compensating device includes a grating element in the form of a bulk or large diameter waveguide, having an outer cladding disposed about an inner core. The grating element may be etched, grounded or machined to form a generally "dog bone" shape, wherein the end portions of the grating element has a larger diameter than the center portion disposed therebetween. A chirped grating is written or impressed within the portion of the core disposed in the center portion of the grating element. The center portion is tapered to allow different stresses to be applied along the grating length when the grating element is compressed longitudinally by force F, and thereby vary chirp of the grating to tunably compensate for dispersion.

13 Claims, 3 Drawing Sheets

U.S. PATENT DOCUMENTS

| | | | |
|---|---|---|---|
| 4,915,467 A | 4/1990 | Berkey | 350/96.15 |
| 5,007,705 A | 4/1991 | Morey et al. | 350/96.29 |
| 5,042,898 A | 8/1991 | Morey et al. | 385/37 |
| 5,235,659 A | 8/1993 | Atkins et al. | 385/124 |
| 5,388,173 A | 2/1995 | Glenn | 385/37 |
| 5,469,520 A | 11/1995 | Morey et al. | 385/37 |
| 5,579,143 A | 11/1996 | Huber | 359/130 |
| 5,691,999 A | 11/1997 | Ball et al. | 372/20 |
| 5,706,375 A | 1/1998 | Mihailov et al. | 385/24 |
| 5,726,785 A | 3/1998 | Chawki et al. | 359/130 |
| 5,745,626 A | 4/1998 | Duck et al. | 385/96 |
| 5,748,349 A | 5/1998 | Mizrahi | 359/130 |
| 6,020,986 A | 2/2000 | Ball | 359/130 |
| 6,148,127 A | 11/2000 | Adams et al. | 385/37 |
| 6,229,827 B1 * | 5/2001 | Fernald et al. | 372/20 |
| 6,275,629 B1 | 8/2001 | Eggleton et al. | 385/37 |
| 6,307,988 B1 | 10/2001 | Eggleton et al. | 385/37 |

FOREIGN PATENT DOCUMENTS

| | | |
|---|---|---|
| EP | 10 26540 | 8/2000 |
| EP | 10 30472 | 8/2000 |
| EP | 10 63545 | 12/2000 |
| EP | 10 65813 | 1/2001 |
| EP | 10 65821 | 1/2001 |
| WO | WO 82 04328 | 12/1982 |
| WO | WO 95 30926 | 11/1995 |
| WO | WO 9626458 | 8/1996 |
| WO | WO 0037969 | 6/2000 |
| WO | WO 00 39617 | 7/2000 |

OTHER PUBLICATIONS

Shin et al, "Design and implementation of PCB–type capacitance displacement sensor collocated with magnetic bearings", Sensors and Actuators, vol. 71, No. 3, 12/98.

* cited by examiner

TUNABLE GRATING-BASED DISPERSION COMPENSATOR

CROSS-REFERENCE TO RELATED APPLICATIONS

This is a continuation-in-part application of U.S. patent application Ser. No. 09/675,455, filed Sep. 28, 2000; now abandoned U.S. patent application Ser. No. 09/675,456, filed Sep. 28, 2000; now abandoned U.S. patent application Ser. No. 09/455,868, filed Dec. 6, 1999; U.S. patent application Ser. No. 09/455,865, filed Dec. 6, 1999, now U.S. Pat. No. 6,519,388 which is a continuation-in-part of U.S. patent application Ser. No. 09/399,495, filed Sep. 20, 1999, now abandoned, which is continuation in part of U.S. patent application Ser. No. 09/205,943, filed Dec. 4, 1998, now abandoned; U.S. patent application Ser. No. 10/146,773, filed May 16, 2002, now U.S. Pat. No. 6,597,711 which is a continuation-in-part of U.S. application Ser. No. 09/707,084, filed Nov. 6, 2000, now abandoned which is a continuation-in-part of U.S. patent application Ser. No. 09/691,997, filed Oct. 19, 2000, now granted (U.S. Pat. No. 6,363,089), which is a continuation of U.S. patent application Ser. No. 09/456,112, filed Dec. 6, 1999, now granted (U.S. Pat. No. 6,229,827), which is a continuation-in-part of U.S. patent application Ser. No. 09/400,362 filed Sep. 20, 1999, now abandoned, which is a continuation-in-part of U.S. patent application Ser. No. 09/205,846, filed Dec. 4, 1998, now abandoned; U.S. application Ser. No. 09/699,940, filed Oct. 30, 2000, now U.S. Pat. No. 6,621,857 which is a continuation-in-part of U.S. patent application Ser. No. 09/519,240, filed Mar. 6, 2000, now abandoned; and U.S. Provisional Application No. 60/276,456, filed Mar. 16, 2001; U.S. patent application Ser. No. 10,098,890, filed Mar. 15, 2002, which claims the priority of U.S. Provisional Patent Application Serial No. 09/675,456, filed Sep. 28, 2000; U.S. patent application Ser. No. 09/950/509, filed Sep. 10, 2001, which is a continuation-in-part of U.S. patent application Ser. No. 09/519,802, now granted (U.S. Pat. No. 6,310,990); and U.S. patent application Ser. No. 10/098,923, filed Mar. 15, 2002, all of which are incorporated herein by reference in their entirety.

TECHNICAL FIELD

The present invention relates to dispersion compensators, and more particularly to a tunable dispersion compensator based on a Bragg grating that allows the dispersion characteristics of a Bragg grating element to be tuned.

BACKGROUND ART

Fiber Bragg gratings can be used as effective filter elements in a range of applications in optical communications networks. The dispersion characteristics of a communication link are crucial in determining performance and transmission fidelity. Gratings, particularly chirped gratings can be used effectively for dispersion compensation. The ability to tune the dispersion introduced by a grating element is important in providing an adjustable element for performance optimization.

As optical networks evolve, there is a trend towards the development of "all-optical" networks, in which communications signal are dynamically routed in the optical domain. One of the issues that affect the ability of network engineers to increase transmission distances & data rates is signal impairments. One of the important parameters of a link is the dispersion of the system, which can create a serious deleterious effect on the signal quality in a high-Gbit optical transmission systems such as 10 Gbits/s and 40 Gbits/s.

Chirped Bragg gratings can be used to compensate for dispersion in a communications link. FIG. 1 depicts a known optical transmission system 10. Optical data 12, which is generated by a laser transmitter 14, is transmitted along a fiber link 16, that may or may not contain optical amplifiers and other devices (that may in themselves be dispersive) to a receiver 18. During the transmission along the fiber link 16, the optical data 12 will be corrupted to a certain degree by differential group delay experienced by different wavelength components of a given wavelength signal. This group delay "smears-out" the data 12 producing poor contrast in the received bit stream 20 at the receiver end. The differential group delay in a signal can be compensated for by the use of an appropriately chirped grating 22. As shown, the light (or received bit stream) 20 from the fiber link 16 is coupled though a circulator 24 to a chirped grating 22. The chirped grating 22 has a bandwidth B and length L. The chirping of the grating 22 results in a strong group delay that can be chosen to be equal to, but opposite to that of the fiber link 16. For example, for a grating length of 10 cm, the differential group delay for a wavelength component reflected from the front of the grating compared to one reflected from the rear of the grating is ~1000 ps. If the grating has a bandwidth of 1 nm, then it's effective dispersion is 1000 ps/nm. Currently, the grating 22 has to be designed to match a given dispersion induced group delay error in a communications link.

SUMMARY OF THE INVENTION

An object of the present invention is to provide a tunable dispersion compensator having a Bragg grating that allows the dispersion characteristics of a Bragg grating element to be tuned.

In accordance with an embodiment of the present invention, an optical waveguide includes an outer cladding disposed about an inner core. A portion of the cladding of the waveguide includes a tapered region. The cladding has a minimum cross-sectional dimension of 0.3 mm. A chirped grating is written in the inner core of the tapered region of the cladding.

In accordance with another embodiment of the present invention, a tunable dispersion compensator includes an optical waveguide having an outer cladding disposed about an inner core. A portion of the cladding has a tapered region. The cladding has a minimum cross-sectional dimension of 0.3 mm. A chirped grating is written in the inner core of the tapered region of the cladding.

BEST MODE FOR CARRYING OUT THE INVENTION

Figure 1:
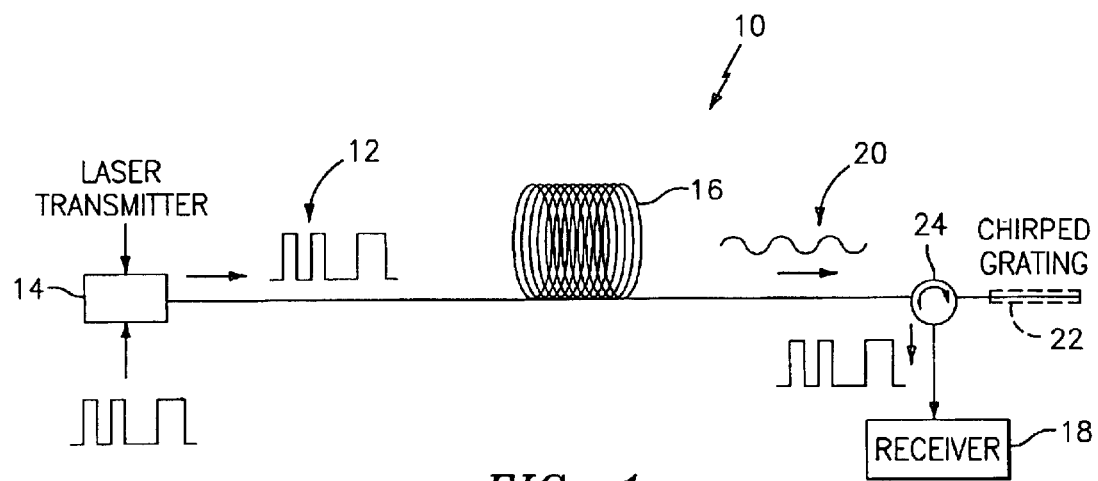
FIG. 1 is a block diagram of an optical transmission system including a Bragg grating-based dispersion compensator that is known in the art.
Figure 2:
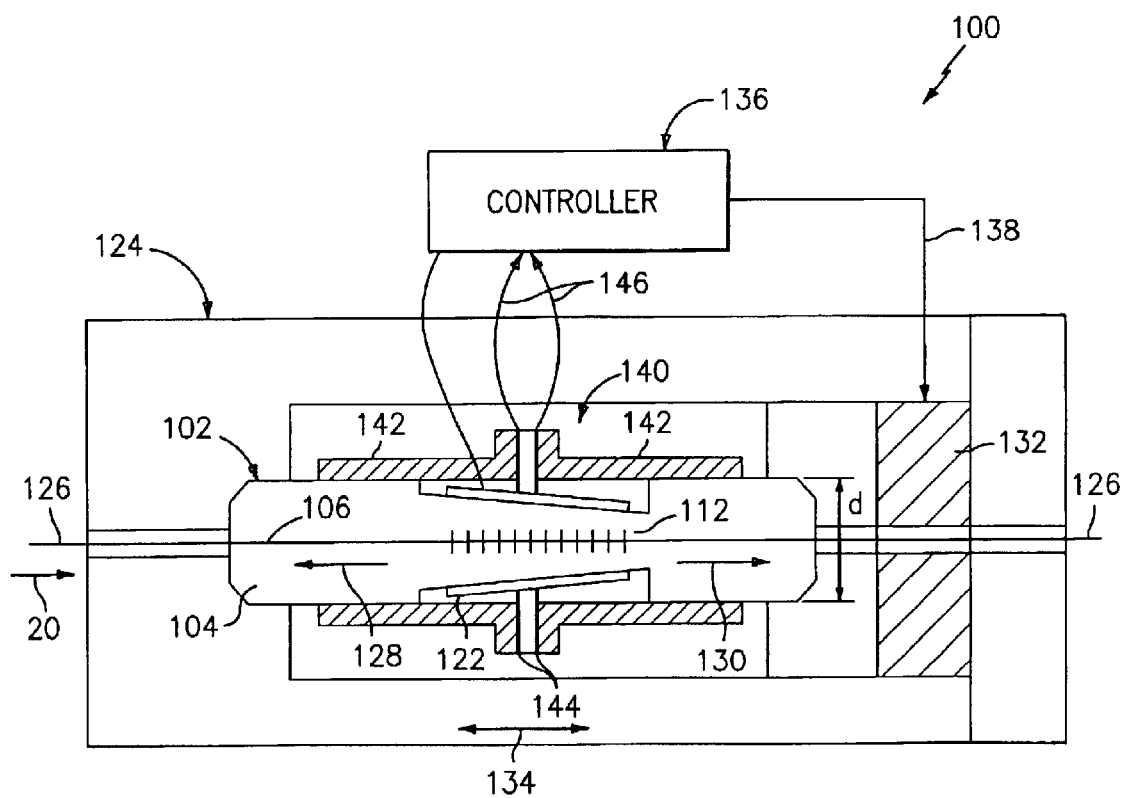
FIG. 2 is a side view of a tunable dispersion compensating device in accordance with the present invention.
Figure 3:
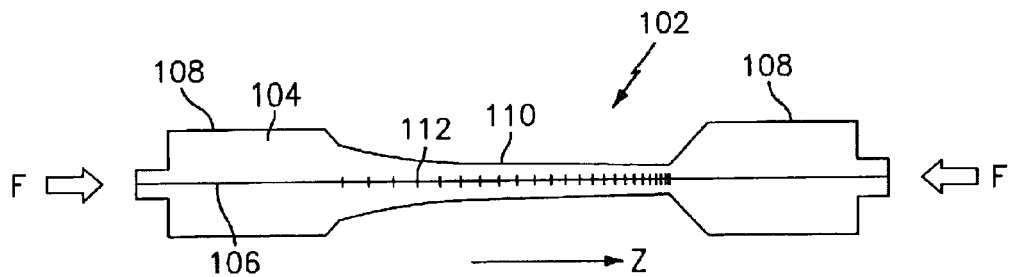
FIG. 3 is a side view of a grating element of a tunable dispersion compensating device having a chirped grating written in a first "sense" in accordance with the present invention.

Referring to FIG. 2, a tunable dispersion compensating device, generally shown as 100, comprises an optical Bragg grating element 102, best shown in FIG. 3. The grating element 102 is a bulk or large diameter waveguide, having an outer cladding 104 disposed about an inner core 106. The grating element may be etched, grounded or machined to form a generally "dog bone" shape, wherein the end portions 108 of the grating element has a larger diameter than the center portion 110 disposed therebetween. A chirped grating 112 is written or impressed within the portion of the core 106 disposed in the center portion 110 of the grating element 102. The center portion 110 is machined into a tapered form to allow different stresses to be applied along the grating length when the grating element 102 is compressed longitudinally by force F.

In the embodiment shown, the cross-sectional area of the center portion 110 of the grating element 102 is gradually reduced from one value to a second value in a linear fashion. In other words, the outer diameter of the center portion tapers from one end to the other as a function of the square root of the distance such that longitudinal compression of the element results in a linear increase in wavelength tuning of the chirped grating 112 along its length. This allows the grating chirp rate 114 a–c to be increased or decreased depending on the 'sense' of the original chirp and the physical taper in the grating element 102.

Figure 4:
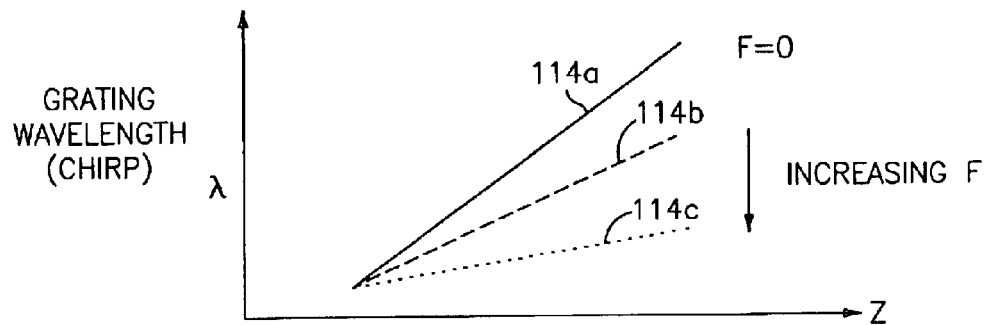
FIG. 4 is a graphical representation of the chirp rate of the grating element of FIG. 3 as the grating is longitudinally compressed.

For example, consider the grating element 102 depicted in FIG. 3 wherein the sense of the chirped grating 112 results in the Bragg wavelength increasing from left to right as depicted. In other words, the spacing of the gratings at the wide end of the center portion of the grating element is greater than the spacings of the gratings at the narrower end. The physical taper in the grating element 102 results in the longer wavelength having a higher sensitivity to compression load than the shorter wavelengths. Consequently, referring to FIG. 4, as the grating element is compressed longitudinally by force F, the grating chirp rate 114 a–c decreases. Furthermore, the compressional loading of the grating element results in a reduction of the chirp bandwidth, as illustrated in FIGS. 5 and 6, and therefore, the dispersion of the grating increases (same group delay is attained over a smaller bandwidth).

Figure 5:
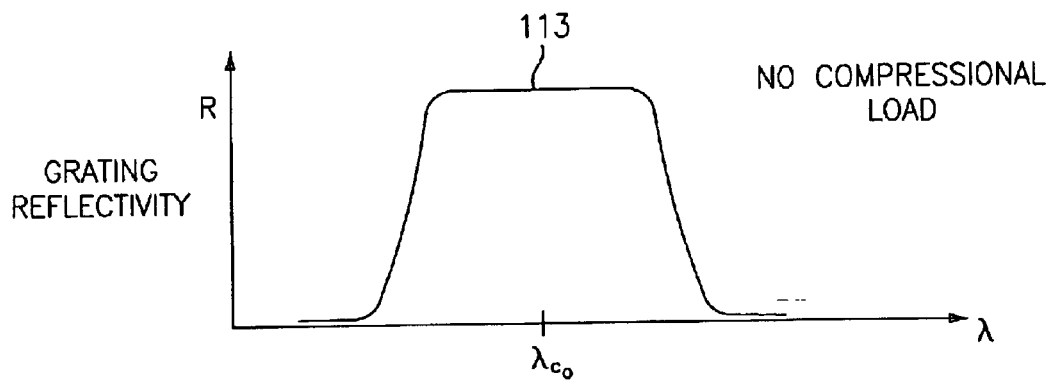
FIG. 5 is a graphical representation of the reflectivity profile of the grating element of FIG. 3 when no compressional load is applied.
Figure 6:
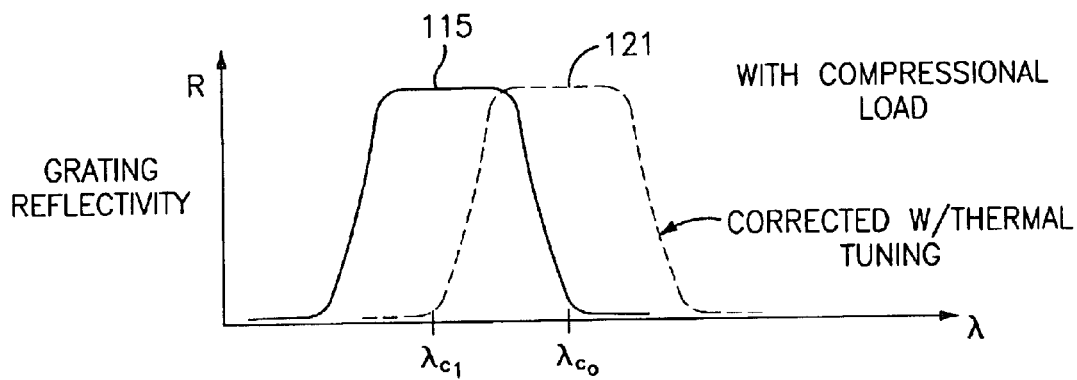
FIG. 6 is a graphical representation of the reflectivity profile of the grating element of FIG. 3 when a compressional load is applied.

Specifically, FIG. 5 shows that the chirp bandwidth 113 of the grating element 102 is relatively wide, when no compressional load is applied. FIG. 6 shows that the chirped bandwidth 115 of the grating 102 is reduced and the center wavelength $\lambda_{co}$ is shifted to $\lambda_{cl}$, when a compressional load is applied.

Figure 7:
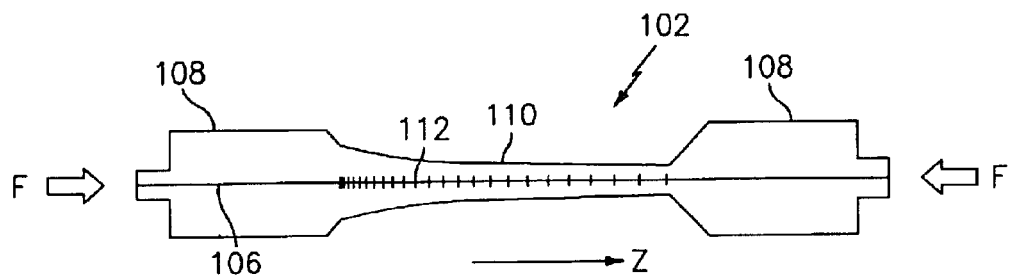
FIG. 7 is a side view of a grating element of a tunable dispersion compensating device having a chirped grating written in a second "sense" in accordance with the present invention.
Figure 8:
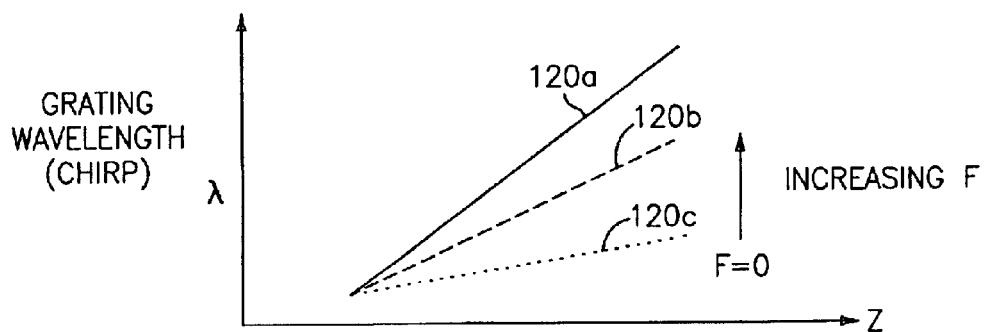
FIG. 8 is a graphical representation of the chirp rate of the grating element of FIG. 7 as the grating is longitudinally compressed.

Alternatively, as shown in FIG. 7, the original chirp may be written into the grating element 102 in the opposite sense, wherein the sense of the chirped grating results in the Bragg wavelength increasing from right to left as depicted. In other words, the spacing of the gratings at the wide end of the center portion 112 of the grating element 102 is less than the spacings of the gratings at the narrower end. The physical taper in the grating element results in the shorter wavelengths having a higher sensitivity to compression load than the longer wavelengths. Consequently, referring to FIG. 8, as the grating is compressed longitudinally by force F, the grating chirp rate 120a–c increases. Conversely to the grating element of FIG. 3, compressional loading of the element results in an increase of the chirp bandwidth, and therefore, the dispersion of the grating decreases (same group delay is attained over a smaller bandwidth).

Consequently, the overall chirp of the grating 112 of grating element 102 is increased by compressive loading, and thus the dispersion is reduced. Either way, the dispersion of the grating element can be tuned up or down from a present value. Tuning over a 1:3 range or greater should be possible using this approach.

As shown in FIG. 6, one limitation of this approach is the compressional tuning also tunes or shifts the overall center wavelength $\lambda_{co}$ of the grating 112. This can cause an issue if the grating bandwidth does not overlap that of the signal at all times and over it's tunable range. This can be compensated by thermal tuning of the grating element, as shown in broken lines at 121 in FIG. 6. Thermal tuning would allow correction of any center wavelength caused by compressional tuning. Thermal tuning could be effected using either heating elements or peltier (TEC) cooler/heater elements 122, as shown in FIG. 2.

Referring to FIG. 3, the optical grating element 102 of the tunable dispersion compensating device 100 is disposed within a compressing device or housing 124. The grating element comprises silica glass (SiO2) having the appropriate dopants, as is known, to allow light to propagate along the inner core, and has an outer diameter (d) of at least 0.3 mm. The grating element 102 may be formed by using fiber drawing techniques now know or later developed that provide the resultant desired dimensions for the core and the outer dimensions, similar to that disclosed in co-pending U.S. patent application, Ser. No. 09/455,868 entitled "Large Diameter Optical Waveguide, Grating, and Laser", which is incorporated herein by reference in its entirety. The grating element 102 may then be etched, grounded or machined to form the "dogbone" shape. A pair of fibers or "pigtails" 126 may be attached to the ends of the grating element by known techniques, such as epoxy or glass fusion.

Alternatively, the optical grating element 102 may be formed by heating, collapsing and fusing a glass capillary tube to a fiber by a laser, filament, flame, etc., as is described in copending U.S. patent application Ser. No. 9/455,865, entitled "Tube-Encased Fiber Grating", which is incorporated herein by reference in its entirety. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

The chirped Bragg grating 112 is written (embedded or imprinted) into the inner core 106 of the grating element 102. The Bragg grating 112 reflects a portion of the light as indicated by a line 128, and passes the remaining wavelengths of the incident light (within a predetermined wavelength range), as indicated by a line 130. The chirped grating 112, as is known, is an aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention.

However, any wavelength-tunable grating or reflective element 112 embedded, written, etched, imprinted, or otherwise formed in the inner core 106 may be used if desired. As used herein, the term "grating" means any of such reflective elements.

Other materials and dimensions for the optical grating element 102 may be used if desired. For example, the grating element 102 may be made of any glass, e.g., silica, phosphate glass, or other glasses, or made of glass and plastic, or solely plastic.

An actuator 132, such as a piezoelectric actuator, axially compresses the grating element 102 within the compression device or housing 124, as indicated by arrows 134. Accordingly, the PZT actuator 132 provides a predetermined amount of force to compress the grating element 102, and thereby tune the grating 112 to a desired center wavelength. In response to a control signal generated by a controller 136 via conductor 138, the PZT actuator 132 is energized to provide the appropriate compression force necessary to tune the grating element to the desired chirp (i.e., bandwidth and center wavelength of reflectivity profile) of the grating 112. The controller 136 adjusts the expansion and retraction of the actuator 132 in response to a displacement sensor 140 that provides feedback representative of the strain or compression of the grating element 102 to form a non-optical closed-loop control configuration. In other words, light 12 propagating through the network or device is not used to provide feedback for the tuning of the grating 112.

In one embodiment, the displacement sensor 140 includes a pair of capacitive elements 142, similar to that disclosed in co-pending U.S. patent application Ser. No. 09/519,802 entitled, "Tunable Optical Structure Featuring Feedback Control", filed Mar. 6, 2000, which is incorporated by reference in its entirety. The controller measures the capacitance between the capacitive plates 144; and provides a sensed signal via conductors 146, indicative of the measured capacitance, to the controller 136. As the grating element 102 is strained, the gap between the parallel capacitive plates 144 will vary, thereby causing the capacitance to change correspondingly. The change in capacitance may be directly or inversely proportional to the change in the chirp of the grating 112, depending on the sense of the chirped grating.

Although the invention has been described with respect to using a capacitor to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of the grating element 54, one should recognize that the grating units may be accurately and repeatedly compressed/tuned to allow the grating unit to operate in an open loop mode.

Alternatively, the grating 112 may be tuned by mechanically stressing (i.e. tension, bending) the grating elements 102. Furthermore, while the grating 112 has been described as being within a grating element 102 in the form of a bulk waveguide, one will appreciate that the grating may be written into a fiber, wherein the grating may be tuned thermally or mechanically (compression or tension).

Figure 9:
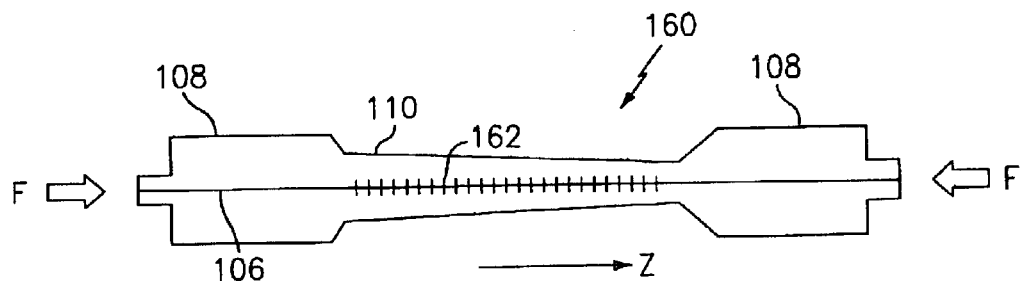
FIG. 9 is a side view of an alternative embodiment of a grating element in accordance with the present invention.

FIG. 9 shows another embodiment of a grating element 160 similar to the grating element 102 of FIG. 3. Contrary to grating element 102, the taper of the center portion 110 of grating element 160 is linear and the grating 162 is periodic. Consequently, as the grating elements are longitudinally compressed, the grating becomes variably chirped and provides a quadratic chirp in the grating.

Figure 10:
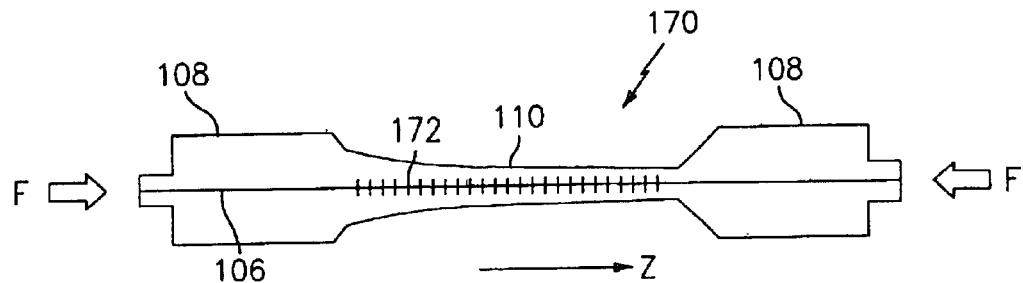
FIG. 10 is a side view of an alternative embodiment of a grating element in accordance with the present invention.

FIG. 10 shows yet another embodiment of a grating element 170 similar to the grating element 102 in FIG. 3. Contrary to grating element 102, the grating 172 of grating element 170 is periodic such that the grating becomes linearly chirped as the grating element 170 is longitudinally compressed. It is further contemplated by the present invention that the grating may be blazed as described in U.S. patent application Ser. No. 10/098,923, which is incorporated herein by reference in its entirety.

It is further contemplated that alternative to thermal tuning, the grating may be temperature compensated such as that shown in U.S. patent application Ser. Nos. 09,519,240 and 09/699,940, each entitled "Temperature Compensated Optical Device", which are incorporated herein by reference in their entirety.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed is:

1. An optical waveguide comprising:
   an inner core; and
   an outer cladding disposed about the inner core, a portion of the cladding including a tapered region, the cladding having a minimum cross-sectional dimension of 0.3 mm; and
   a chirped grating written in the inner core of the tapered region of the cladding.

2. The optical waveguide of claim 1, wherein the tapered region varies from a first end to a second end as a function of the square root of the distance therebetween, the first end having a greater cross-section than the second end.

3. The optical waveguide of claim 2, wherein the chirped grating is written in the inner core such that the Bragg wavelength of the chirped grating increases from the first end to the second end of the tapered region.

4. The optical waveguide of claim 1, wherein the tapered region varies linearly from a first end to a second end, the first end having a greater cross-section than the second end.

5. A tunable dispersion compensator comprising:
   an optical waveguide including:
      an outer cladding disposed about an inner core, a portion of the cladding including a tapered region, the cladding having a minimum cross-sectional dimension of 0.3 mm; and
      a chirped grating written in the inner core of the tapered region of the cladding.

6. The tunable dispersion compensator of claim 5, wherein the optical waveguide comprises:
   an optical fiber, having a reflective element written therein; and
   a tube, having the optical fiber and the reflective element encased therein along a longitudinal axis of the tube, the tube being fused to at least a portion of the fiber.

7. The tunable dispersion compensator of claim 5, further includes a compressing device for compressing simultaneously and axially the optical waveguide, wherein chirped grating is disposed along an axial direction of the optical waveguide.

8. The tunable dispersion compensator of claim 7, further includes a thermal element for varying the temperature of the unchirped grating to tune the unchirped grating to a selected center wavelength.

9. The tunable dispersion compensator of claim 7, wherein the displacement sensor includes a capacitance sensor coupled to the optical waveguide for measuring the change in the capacitance that depends on the change in the displacement of the optical waveguide.

10. The tunable dispersion compensator of claim 5, further includes a straining device for tensioning axially the optical waveguide to tune the chirped grating, wherein the chirped grating is disposed along an axial direction of the optical waveguide.

11. The tunable dispersion compensator of claim 5, wherein the tapered region varies from a first end to a second end as a function of the square root of the distance therebetween, the first end having a greater cross-section than the second end.

12. The tunable dispersion compensator of claim 5, wherein the tapered region varies linearly from a first end to a second end, the first end having a greater cross-section than the second end.

13. The tunable dispersion compensator of claim 11, wherein the chirped grating is written in the inner core such that the Bragg wavelength of the chirped grating increases from the first end to the second end of the tapered region.

* * * * *